(12) United States Patent
Lee et al.

(10) Patent No.: US 6,805,070 B2
(45) Date of Patent: Oct. 19, 2004

(54) FLUID CONTAINER WITH LEVEL INDICATOR, AND FLUID LEVEL INDICATOR ASSEMBLY FOR A FLUID CONTAINER

(75) Inventors: Lin Lee, Powell, OH (US); Yan Beaudoin, Dublin, OH (US); Steven Thiele, Marysville, OH (US); Michael Binfet, Bellefontaine, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/267,965

(22) Filed: Oct. 9, 2002

(65) Prior Publication Data

US 2004/0069205 A1 Apr. 15, 2004

(51) Int. Cl.[7] ............................................. G01F 23/00
(52) U.S. Cl. .................. 116/109; 116/227; 116/DIG. 7; 73/298
(58) Field of Search ................................. 116/109, 227, 116/110, 228, DIG. 7; 206/459.1, 459.5; 73/290 R, 322, 299, 298, 297

(56) References Cited

U.S. PATENT DOCUMENTS

| | | | |
|---|---|---|---|
| 922,284 A | * 5/1909 | Jones | 73/302 |
| 1,116,934 A | * 11/1914 | Seltzer et al. | 116/109 |
| 1,442,826 A | * 1/1923 | Renstrom | 184/13.1 |
| 1,477,145 A | * 12/1923 | Marone | 116/227 |
| 1,485,492 A | * 3/1924 | Du Pont | 73/297 |
| 1,566,338 A | * 12/1925 | Mayhew | 116/109 |
| 2,511,649 A | * 6/1950 | Reiter | 73/297 |
| 3,120,125 A | 2/1964 | Vasel | |
| 3,272,174 A | * 9/1966 | Pribonic | 340/450.2 |
| 3,548,657 A | 12/1970 | Panerai et al. | |
| 3,675,483 A | * 7/1972 | David, IV | 73/327 |
| 3,969,942 A | * 7/1976 | Hope et al. | 73/302 |
| 4,213,338 A | 7/1980 | Hardy | |
| 4,669,309 A | * 6/1987 | Cornelius | 73/299 |
| 5,791,187 A | * 8/1998 | Chang | 73/299 |
| 5,808,187 A | 9/1998 | Gooden et al. | |
| 6,173,609 B1 | 1/2001 | Modlin et al. | |

* cited by examiner

*Primary Examiner*—Diego Gutierrez
*Assistant Examiner*—Travis Reis
(74) *Attorney, Agent, or Firm*—Carrier, Blackman & Associates, P.C.; William D. Blackman; Joseph P. Carrier

(57) ABSTRACT

A fluid storage container provides a visual display of a fluid level therein. The container has a plurality of capillary tubes attached thereto, correlating to predetermined fluid levels within the container, and which may be visually observed upon inspection of the capillary tubes. Each of the capillary tubes has an inlet at a lower end thereof, and the inlets are located at different vertical levels from one another. When fluid in the container is at a level above an inlet of a given capillary tube, the capillary tube automatically fills with fluid, providing a visual signal of the fluid level.

17 Claims, 3 Drawing Sheets

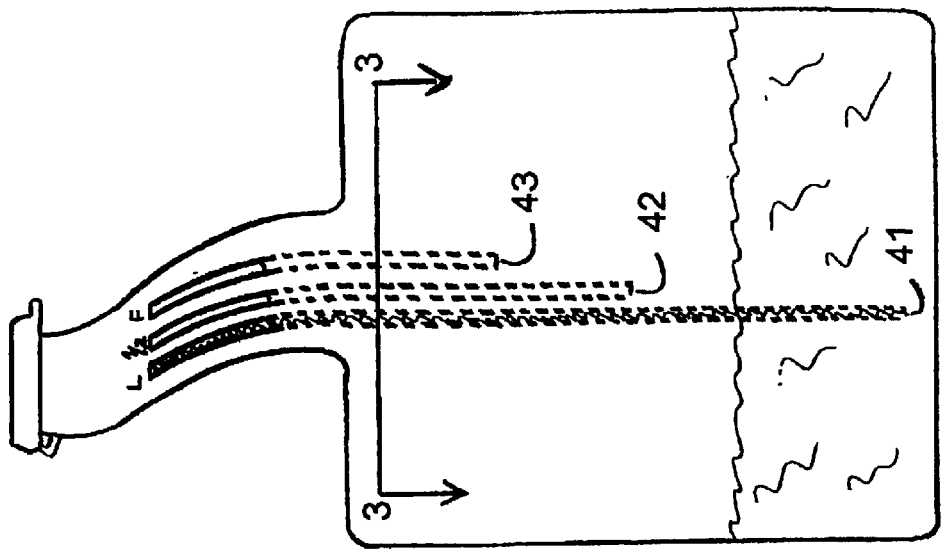
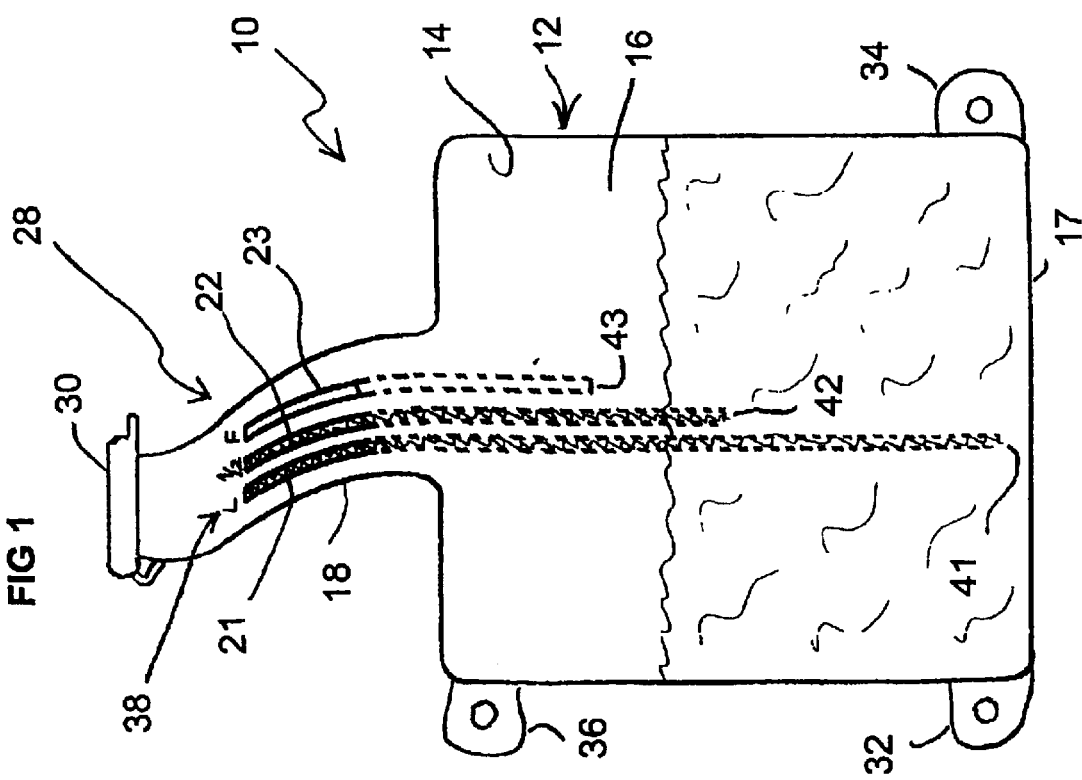

FLUID CONTAINER WITH LEVEL INDICATOR, AND FLUID LEVEL INDICATOR ASSEMBLY FOR A FLUID CONTAINER

FIELD OF THE INVENTION

The present invention relates to a container for storing and dispensing a fluid, and to a fluid level display apparatus for use with a fluid storage container. More particularly, the present invention relates to a fluid storage container including a fluid level display apparatus, and to a fluid level display apparatus including a plurality of capillary tubes.

BACKGROUND OF THE INVENTION

Within the automotive field, many engine fluids are measured through the insertion of a dipstick into a fluid container or reservoir. By way of example, dipsticks are typically used for measuring power steering fluid, motor oil, and transmission fluid.

Other motor vehicle fluids may be measured by visual examination, i.e. by an individual either removing the lid of a fluid container and looking inside the container to observe the fluid level, or by the provision of a translucent or semi-translucent container body, used in combination with a colored fluid. Such a combination of a translucent container body and colored fluid allows an observer to note the fluid level by looking at the outside of the tank. Vehicular fluids measurable by this second method include windshield washer solvent, engine coolant, and brake fluid.

A modern trend in the design of motor vehicles has been toward using virtually all available space within an engine compartment, which may reduce the amount of space in which a fluid reservoir may be conveniently mounted for visual observation. Therefore, there is a tendency to place fluid reservoirs in partially hidden locations, which results in only the filler neck remaining visible. However, it remains important for a driver and/or for vehicle service personnel to monitor the vehicle fluids, in order to ensure that they are maintained at recommended levels, in order to minimize the likelihood of component failure.

In response to the ongoing need to monitor fluid levels within a container or reservoir, some level sensing devices for displaying the fluid level within a container or reservoir have been developed. Some known devices for monitoring and/or displaying a fluid level within a container or reservoir are illustrated in U.S. Pat. Nos. 3,120,125; 3,548,657; 4,213,338; 5,808,187; and 6,173,609, which are discussed further below.

Vasel, U.S. Pat. No. 3,120,125, entitled, "Liquid Level Determining Device and Method," discloses a method for determining the level of a liquid in a container, using an optical transilluminating means which directs light into and through the container in an attempt to detect the level of a liquid.

Panerai et al., U.S. Pat. No. 3,548,657, entitled, "Device For An Outside Display Of The Level Of A Liquid Contained Within A Tank," discloses a container with optical light transmitting elements within a vertical wall thereof, and a light source. The device of Parnerai et al. visually displays the level of liquid in a container as a result of contact from the light source to the optical light transmitting elements.

Hardy, U.S. Pat. No. 4,213,338, entitled, "Liquid Level Indicator," discloses an indicator for the amount of liquid in a dishwasher rinse aid dispenser tank. The Hardy invention incorporates a drain tube extending from the bottom of the tank, which tube is observable through a window in an interior wall of a dishwasher, to serve as a visual indicator for the level of liquid in the tank.

Gooden et al., U.S. Pat. No. 5,808,187, entitled, "Fluid Level Indicator," discloses a fluid reservoir including a sealed standpipe for measuring the level of fluid contained therein. The Gooden et al. invention provides a visual indication as to the level of fluid in a reservoir while filling the reservoir by selectively permitting the fluid to overflow into the center of the standpipe, thereby illustrating to a person that the reservoir is full.

Modlin et al., U.S. Pat. No. 6,173,609, entitled, "Optical Level Sensor," discloses an optical sensor for visually displaying the level of fluid within a given container. The Modlin et al. invention incorporates waveguides for measuring the amount of light capable of traveling through the fluid, which correlates to the level of fluid within the container, as displayed by the optical sensor.

While each of the aforementioned inventions provides a device for measuring fluid levels within a container or reservoir, a need still exists in the art for an improved fluid storage tank apparatus, capable of passively displaying the fluid level therein. Ideally, a fluid level display apparatus would allow an observer to see an indicator of a fluid level in the container, even though the main tank body may be hidden from view.

SUMMARY OF THE INVENTION

The present invention has been developed to overcome limitations and disadvantages of the prior art, and to generally fulfill a need in the art for a simple and reliable fluid storage tank, usable in a motor vehicle, which passively displays the level of fluid therein in a way that is easily observable to a user thereof.

A fluid storage apparatus in accordance with a first embodiment of the present invention includes a main tank body including at least one side wall defining a substantially watertight chamber for storing a fluid. The tank may include multiple side walls, as desired. The tank may be molded in a cylindrical shape, or any other shape custom formed to accommodate the available space within a designated portion of a vehicle's engine compartment. Although the storage tank hereof may remain confined to a relatively inaccessible location, which is not easily viewable, a section of the storage tank neck remains accessible from the top of the engine compartment to allow refilling.

The tank body further has a filler neck and a removable cap for containing fluid within the watertight chamber, and for providing access to allow filling of the chamber. The tank also includes a display assembly, including a plurality of capillary tubes of varying lengths. The capillary tubes extend to different fluid levels within the tank body. Preferably, the tank has an aperture formed within a wall of the chamber, to provide an outlet for dispensing the fluid.

Accordingly, it is an object of the present invention to provide a method and apparatus for passively displaying a fluid level within a hollow fluid storage tank.

It is a second object of the invention to provide a fluid storage tank having a passive fluid level display assembly, including indicia for visually showing a current fluid level therein.

It is a third object of the invention to provide a fluid level display assembly including a plurality of capillary tubes of varying lengths, which extend downwardly from an upper part of the storage tank into the chamber at respective designated levels, and in which the designated levels are different from one another.

The capillary tubes are preferred to be substantially translucent, which provides an accurate visual assessment of the fluid level within the chamber at a glance, allowing a user to quickly see whether or not a given capillary tube contains fluid.

In a first embodiment of the invention, a plurality of substantially translucent capillary tubes are independent of the side walls of the fluid storage tank, and are secured thereto. In this embodiment, the capillary tubes may reside entirely within the chamber of the fluid storage tank. Alternatively, in this embodiment, the tubes may be partially routed outside of the tank, to provide a more easily viewed visual signal. The tubes may be made clear or semi-translucent.

In a modified embodiment of the invention, multiple translucent capillary tubes of different colors are provided, and these different colors symbolize the different levels of fluid within the chamber of the fluid storage tank.

In another embodiment of the invention, multiple translucent capillary tubes are provided, with at least part of said tubes being integrally formed within a sidewall of the fluid storage tank. These capillary tubes extend from predetermined inlet locations within the chamber to a point proximate an upper portion of the fluid storage tank.

Other objects, advantages and salient features of the invention will become apparent from the following detailed description which, in conjunction with the annexed drawings, discloses the presently preferred embodiments of the invention.

BRIEF DESCRIPTION OF THE DRAWINGS

FIG. 1 is a front plan view of a fluid storage and level display apparatus including a level display assembly according to a first illustrative embodiment of the invention, showing a first fluid level therein at a first time.

FIG. 2 is a front plan view of the apparatus of FIG. 1, showing a second fluid level therein at a second time.

DETAILED DESCRIPTION

Figure 3:
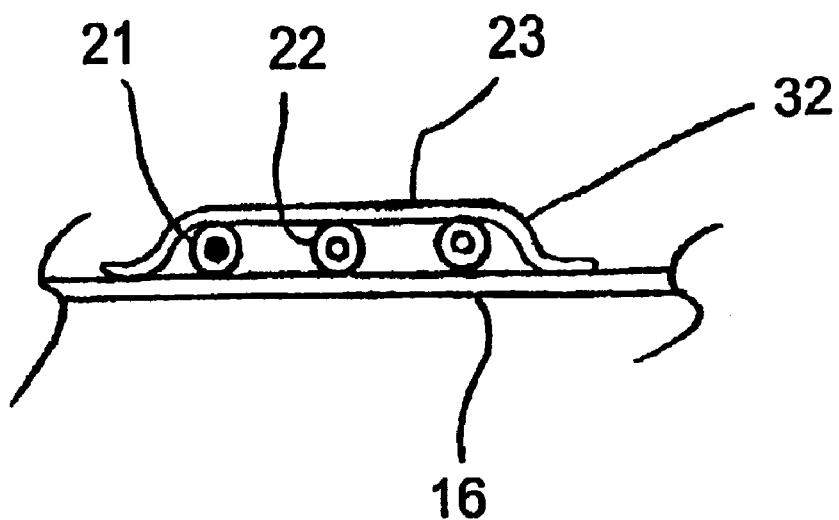
FIG. 3 is a cut away cross-sectional view of a tank side wall of the apparatus of FIGS. 1–2, taken along the line 3—3 in FIG. 1.

Referring now to the drawings, in FIGS. 1–2, there is shown a storage tank and fluid level display apparatus 10, including a fluid level display 28, according to a first embodiment of the invention.

The apparatus 10 generally includes a hollow tank body 12 having an interior chamber 14 formed therein. The tank body 12 has at least one side wall 16, and also includes a filler neck 18 integrally attached to the side wall 16. The tank body 12 may have a rectangular box shape, may be substantially cylindrical, or may be made in a custom shape to fit the available space within an engine compartment. A removable cap 30 is provided to cover the tank filler neck 18.

The tank body 12 may include one or more integral apertured mounting flanges, such as those shown at 32, 34, 36 (FIG. 1), for use with screws, bolts or other conventional fasteners.

The tank body 12 is constructed of a lightweight, substantially rigid material such as blow-molded polyethylene, nylon or other suitable heat-tolerant plastic, keeping in mind that the ambient temperature within the engine compartment may be subject to extremes of hot and cold. In this first embodiment, the tank body 12 may be made translucent or opaque.

As noted, the tank body 12 incorporates an internal chamber 14 for storing fluid. The internal chamber 14 extends vertically though the filler neck 18 of the apparatus. The internal chamber 14 is substantially sealed after installation, and is capable of holding a predetermined amount of fluid therein, for dispensing through a conventional pumping assembly which engages the storage tank at a dispensing outlet (not shown).

The fluid level display 28 includes a plurality of hollow, substantially parallel capillary tubes 21, 22, 23 and corresponding indicia 38, as will be further described herein. The capillary tubes 21, 22, 23, extend downwardly along the side wall 16 of the tank body 12. The capillary tubes are constructed of material similar to that used for the tank body 12, and are preferred to be either transparent or translucent, so the contents thereof can readily be observed, if the tube contains any colored fluid.

Also, the capillary tubes may be constructed of other material suitable for displaying fluid, such as flexible or rigid piping; either transparent, translucent, or possibly opaque material including a window for viewing the liquid. Such material may be rubber, polyvinyl chloride, elastomeric tubing, stainless steel or aluminum. Transparent flexible elastomeric tubing is preferred in the first embodiment of the invention.

In the embodiment of FIG. 1, each of the respective capillary tubes 21, 22, 23 is formed separately from the tank body 12, and is attached thereto, using appropriate hardware, such as the crossmember bracket shown in FIG. 3. Each of the tubes 21, 22, 23 extends from a lower section located inside the tank body, shown in phantom in the drawing, outwardly through a respective sealed opening formed through the tank body 12, and to an upper section disposed outside of the tank body. The upper section is shown in solid lines in the drawing, and is situated outside of the tank body for maximum visibility of the contents thereof. In the embodiment of FIG. 1, it is preferred that the uppermost lop ends of the capillary tubes 21, 22, 23 pass back through a second sealed opening in the wall of the neck 18 and vent into the neck portion of the chamber 14.

The capillary tubes 21, 22, 23 are preferably formed from transparent material. Optionally, the capillary tubes 21, 22, 23 may each be tinted a different color to provide color-coding for each fluid level.

The capillary tubes 21, 22, 23 are open at both the top and bottom ends thereof, and are capable of 'wicking' up fluid through respective inlet openings 41, 42, 43 at their lower ends, whenever the fluid level is at or above the level of the respective inlet. It is preferred that the upper ends of the capillary tubes 21, 22, 23 be vented into the chamber 14 inside of the tank body 12, in order to reduce the likelihood of spillage.

It will be noted from FIG. 1 that a first capillary tube 21 has a first length and extends downwardly from a point on the neck 18 to a low level, proximate to and just above the tank floor 17. The first tube 21 has an inlet 41 formed in the lower end thereof, and will pick up and fill with fluid when the tank body 12 is filled to a level at or above the inlet 41 thereof.

A second capillary tube 22 has a second, intermediate length, shorter than the length of the first tube 21. The second tube 22 extends downwardly from a point on the neck 18 to a middle level, about halfway up the tank body 12. The second tube 22 has an inlet 42 formed in the lower end thereof, and will pick up and fill with fluid when the tank body 12 is filled to a level at or above the inlet 42 thereof.

Similarly, a third capillary tube 23 has a third length, shorter than the length of the second tube 22. The third tube 23 extends downwardly from a point on the neck 18 to an upper level, near the top of the tank body 12. The third tube 23 has an inlet 43 formed in the lower end thereof, and will pick up and fill with fluid when the tank body 12 is filled to a level at or above the inlet 43 thereof.

The display apparatus 28 is preferred to include respective indicia, such as that shown at 38, to represent to the relative fluid levels at each of the respective tube inlets 41, 42, 43. The apparatus of FIG. 1 shows a capital L above the first tube 21 to represent a low fluid level, a ½ above the second tube 22 to represent a half-full condition, and a capital F above the third tube 23, to represent a full condition.

A comparison of FIGS. 1 and 2 will show that in FIG. 1, with the fluid in the tank body 12 at a level above the inlet 42 of the second capillary tube 22, both the first and second capillary tubes 21, 22 fill to the top with the fluid, indicating a ½ full condition. When the fluid is used up further and drops to a lower level, below the inlet 42 of the second tube 22 but still above the inlet 41 of the first tube 21 as shown in FIG. 2, the fluid drains outwardly from the inlet 42 under the influence of gravity. As a result, in this instance only the first tube 21 remains full, indicating a low condition and signaling to an observer that the tank should be refilled.

Referring to FIG. 1, it will be seen that fluid level measurement indicia 38 are provided along the upper section of the tank body 12, each of which corresponds to a particular capillary tube. The measurements of the fluid level are located in a manner so as to be viewable upon observation of the filler neck 18 by an individual examining the engine compartment of a vehicle. As shown in the depicted embodiment, the fluid level measurements are molded into the storage tank, but may alternatively be painted on, affixed to a label adhered to the storage tank.

Figure 4:
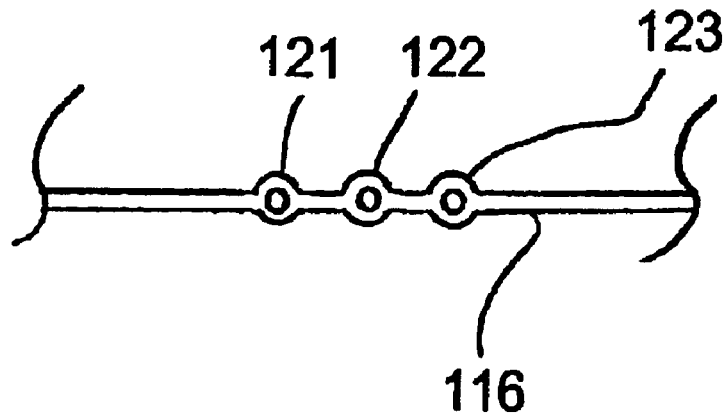
FIG. 4 is a cross-sectional view of a tank side wall according to a second embodiment of the invention.

However, as an alternative embodiment of the apparatus 10, as shown in FIG. 4, part or all of the capillary tubes 121, 122, 123 may be incorporated into, and integrally formed as a molded part of a sidewall 116 of the storage tank 12. In this embodiment, it would be necessary to use a translucent material to form the tank body 12. When viewed from the front, this modified embodiment would have an appearance similar to that shown in FIGS. 1 and 2.

Figure 5:
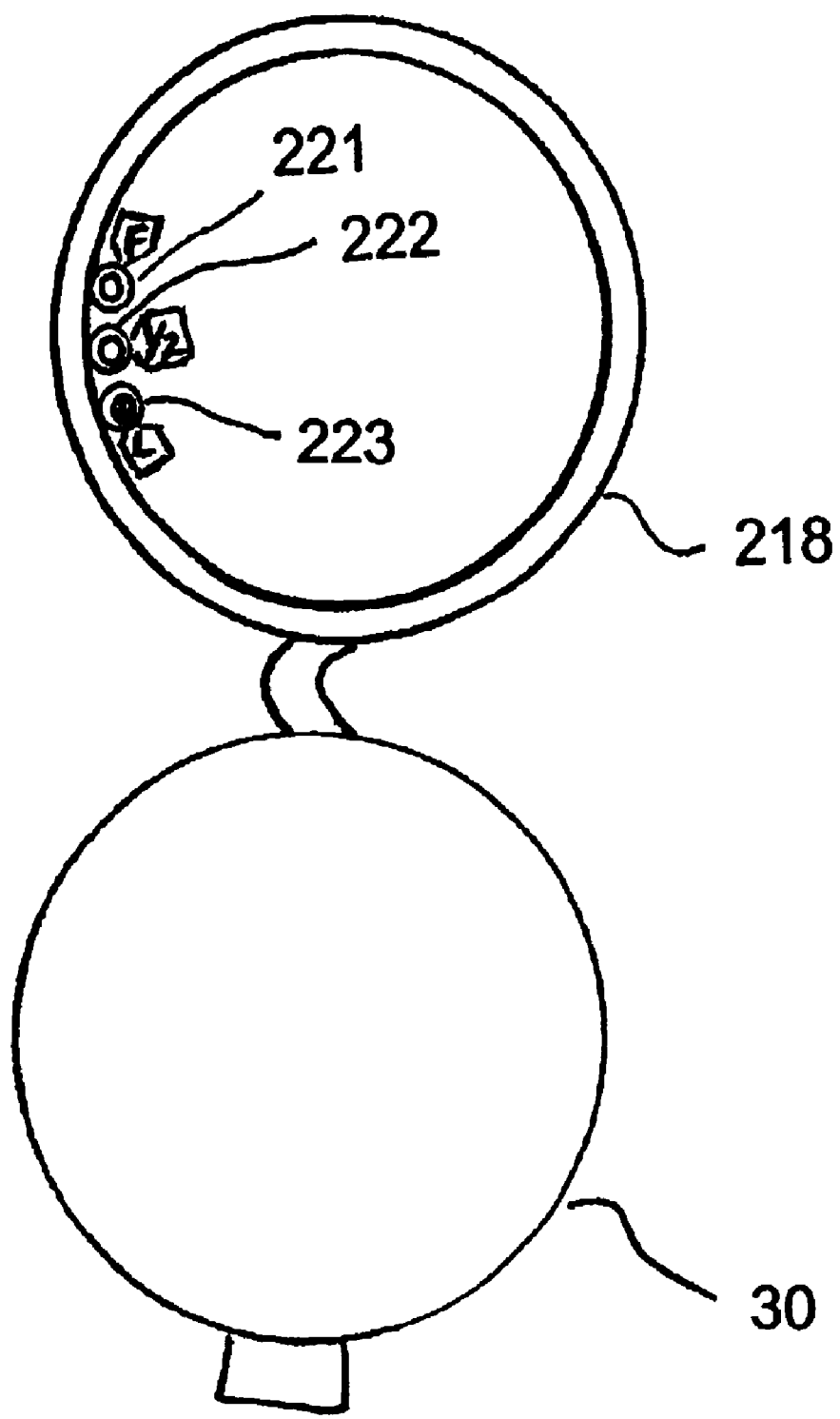
FIG. 5 is a top plan view of a filler neck portion of a storage tank, showing a level display apparatus therein in accordance with a third embodiment of the invention.

In another alternative embodiment, as shown in FIG. 5, the capillary tubes 221, 222, 223 may be visible only when opening the removable cap 30, and looking down into the filler neck 218. In this embodiment, each of the capillary tubes 221, 222, 223 has appropriate level indicia associated therewith, as shown.

In yet another embodiment of the invention, a display apparatus could be provided for attachment to a fluid storage container. Such a display apparatus would include a plurality of capillary tubes such as those shown at 21, 22 and 23 in FIGS. 1–3, and a crossmember to hold the capillary tubes in fixed relation to one another.

Although the present invention has been described herein with respect to a preferred embodiment thereof, the foregoing description is intended to be illustrative, and not restrictive. Those skilled in the art will realize that many modifications of the preferred embodiment could be made which would be operable. For example, the present invention may not be limited to a level sensor for a fluid container in an automotive engine compartment, but instead, an apparatus according to the invention could be used in substantially any fluid storage container where capillary action could be used to fill a capillary tube with a colored liquid. All such modifications which are within the scope of the appended claims are intended to be within the scope and spirit of the present invention.

What is claimed is:

1. An apparatus for holding a fluid and for visually displaying a fluid level therein,
    said apparatus comprising:
        a hollow tank having an internal cavity therein, the tank having at least one side wall and having a filler neck;
        a cap which fits sealably directly on top of the filler neck; and
        a display assembly operatively attached to said tank and comprising a plurality of capillary tubes, each of the tubes extending downwardly from a first region of the tank to a respective predetermined level within the internal cavity of said tank,
        wherein each of said tubes has an open upper end disposed below said cap and a lower end defining an inlet, and wherein the inlets of the different capillary tubes are located at different levels from one another;
        and further wherein each of the capillary tubes is capable of drawing fluid through the inlet thereof, and conducting the fluid upwardly therein to an area thereof proximate said filler neck, when a fluid level within the tank is at or above the level of the tube inlet.

2. The apparatus of claim 1, wherein said display assembly comprises at least three capillary tubes.

3. The apparatus of claim 1, wherein said tank has a plurality of tube openings formed therethrough, and each of said capillary tubes includes an upper portion which is disposed outside of said tank through said tube openings.

4. The apparatus of claim 1, wherein said display assembly includes indicia adjacent an upper end of said capillary tube.

5. The apparatus of claim 1, wherein said capillary tubes are integrally formed with said tank.

6. The apparatus of claim 1, wherein each of said capillary tubes includes a portion which is integrated within a sidewall of said tank.

7. The apparatus of claim 6, further comprising indicia associated with each of said capillary tubes.

8. The apparatus of claim 1, wherein said capillary tubes are independent of said tank, and are secured to a sidewall of said tank.

9. The apparatus of claim 1, wherein said display assembly is located inside of said tank, and is observable when said cap is removed.

10. The apparatus of claim 1, wherein at least one sidewall of said tank is substantially translucent.

11. The apparatus of claim 1, wherein said capillary tubes are substantially translucent.

12. A method for determining the fluid level within the apparatus of claim 1, comprising the steps of:
    observing each of said capillary tubes to determine which of said capillary tubes contain fluid;
    wherein the filled capillary tube indicative of the highest fluid level corresponds to the fluid level in the tank.

13. A method of determining whether the apparatus of claim 1 is full while filling said tank, comprising the steps of:

removing the removably sealable cap from the filler neck;
adding fluid to said tank through said filler neck;
continuing to add fluid into said tank until the capillary tube indicative of the highest fluid level contains fluid; and
replacing the removably sealable cap over said filler neck.

14. The apparatus of claim 1, wherein the apparatus is dimensioned to fit in an engine compartment of a vehicle.

15. An apparatus for holding a fluid and for displaying a fluid level therein, comprising:
   a hollow tank having an internal cavity therein, the tank having at least one side wall and having a filler neck;
   a cap which fits sealably directly on top of the filler neck; and
   a display assembly comprising at least three capillary tubes, each of said capillary tubes including a portion which is integrally formed within said tank side wall, each of the tubes extending downwardly from a first region of the tank to a respective predetermined level within the internal cavity of said tank,
   said display assembly further comprising indicia associated with each of said capillary tubes,
   wherein each of said tubes has an open upper end disposed below said cap and a lower end defining an inlet, and wherein the inlets of the different capillary tubes are located at different levels from one another;
   and further wherein each of the capillary tubes is capable of drawing fluid through the inlet thereof, and conducting the fluid upwardly therein to an area thereof proximate said filler neck, when a fluid level within the tank is at or above the level of the tube inlet.

16. The apparatus of claim 15, wherein said capillary tubes are valveless and are in fluid communication with said reservoir at both the top and bottom ends thereof.

17. The apparatus of claim 15, wherein the apparatus is dimensioned to fit in an engine compartment of a vehicle.

* * * * *

UNITED STATES PATENT AND TRADEMARK OFFICE
CERTIFICATE OF CORRECTION

PATENT NO. : 6,805,070 B2
DATED : October 19, 2004
INVENTOR(S) : Lee et al.

It is certified that error appears in the above-identified patent and that said Letters Patent is hereby corrected as shown below:

Column 4,
Lines 45 and 46, change "uppermost lop ends" to -- uppermost top ends --.

Signed and Sealed this

Nineteenth Day of April, 2005

JON W. DUDAS
*Director of the United States Patent and Trademark Office*